(12) United States Patent
Lyons et al.

(10) Patent No.: US 12,722,099 B2
(45) Date of Patent: Sep. 1, 2026

(54) HIDDEN COMPARTMENT APPARATUS

(71) Applicants: Joya Lashan Lyons, Huntersville, NC (US); Andrew David Lyons, II, Huntersville, NC (US)

(72) Inventors: Joya Lashan Lyons, Huntersville, NC (US); Andrew David Lyons, II, Huntersville, NC (US)

( * ) Notice: Subject to any disclaimer, the term of this patent is extended or adjusted under 35 U.S.C. 154(b) by 557 days.

(21) Appl. No.: 18/118,939

(22) Filed: Mar. 8, 2023

(65) Prior Publication Data

US 2023/0285872 A1 Sep. 14, 2023

Related U.S. Application Data

(60) Provisional application No. 63/318,139, filed on Mar. 9, 2022.

(51) Int. Cl.
*A63J 21/00* (2006.01)
*A61C 19/00* (2006.01)

(52) U.S. Cl.
CPC ............. *A63J 21/00* (2013.01); *A61C 19/008* (2013.01)

(58) Field of Classification Search
CPC ..... A63J 21/00; A61C 19/008; A61C 2202/00
See application file for complete search history.

(56) References Cited

U.S. PATENT DOCUMENTS 5,041,044 A * 8/1991 Weinreich .............. A63H 33/22 40/442
5,522,507 A * 6/1996 Cruz .................... A61C 19/008 428/3
2022/0193572 A1* 6/2022 Lyons ..................... A63J 21/00
2022/0409350 A1* 12/2022 Vaughn ................ A61C 19/008

FOREIGN PATENT DOCUMENTS

DE 202013005698 * 9/2013

OTHER PUBLICATIONS

English translation of DE 202013005698 (Year: 2013).*

* cited by examiner

*Primary Examiner* — Amr A Awad
(74) *Attorney, Agent, or Firm* — Fraline J. Allgaier

(57) ABSTRACT

A hidden compartment apparatus supporting an illusion that an object has disappeared from a first position of a holder slide member is provided. The hidden compartment apparatus includes a holder slide member that is slidably coupled to the bottom of a holder slide cover with a stationary opening, a plurality of inserts capable of holding objects placed in integral holder slider pockets, and actuating means. The actuating means being configured to move the holder slide member between a first position and a second position within the housing and positioning the integral transport slider pockets in the stationary opening to reveal one insert at a time based on user operated controls.

13 Claims, 9 Drawing Sheets

22

10
18
36
12
56
14
16
42
38
36
24

38
36
34
32
38
46
48
36
24

42
36
32
24

LEFT SIDE 74
74
66
BOTTOM
66
74
74
14
10

TOP

RIGHT SIDE

HIDDEN COMPARTMENT APPARATUS

RELATED APPLICATIONS

This application claims priority to U.S. Provisional Patent Application Ser. No. 63/318,139 filed Mar. 9, 2022.

FIELD OF THE INVENTION

The present disclosure is directed towards the construction and design of a hidden compartment apparatus. More particularly, the subject matter is the means by which the hidden compartment apparatus supports the illusion that a first object that is placed in a first position of a holder slide member disappears and is replaced with a second object that is placed in a second position of a holder slide member of identical construction.

BACKGROUND OF THE INVENTION

Young children readily embrace an assortment of toys including replicas of vehicles, animals, dolls, costumes, telephones, dollhouses, and cuboidal shapes. Children especially enjoy using their imagination and playing with toys that include a pretense when using the toys. Many such toys incorporate moving parts which can be operated or moved as a part of the play process.

Various approaches have been used by others to provide the illusion that a second item has appeared in the identical location and orientation of a first item. Some approaches to support an illusion have included sewing pockets into books, stuffed animals, pillows, or similar toys to hide an amusement item. In some cases, portable devices such as backpacks, organizers, camping supplies, etc. have been used to hide such items in foldable pockets further providing additional surprise play areas. These items can include caricatures, toys, candy, or the like, whereby children are amused.

Play boxes with cranks are also well known in the art. When a crank is turned, lids pop open and surprise figures such as clowns or a caricature startle the child. Advancements have also been made to modern toys to provide for the release of various types of figurines once a lid is successfully opened, a puzzle is solved, or a mathematical calculation is inputted. In some cases the figurines might contain coins, gift cards, additional toys, or similar prizes to award the child who successfully opens the toy.

It is believed, that none of the devices provided in the prior art enhance the illusion of a disappearing object. In the present invention, the illusion of a disappearing object is accomplished by providing a first object in a first insert and presenting a second object for viewing by a child and wherein the second object reappears in a second insert of identical construction and in the identical spot wherein the first object was placed. These locations coincide in the view of the child as a consequence of particular elements of the apparatus. Therefore, the illusion that one item magically disappears is attained.

The apparatus is further characterized with the following novel features: (1) An automatically actuated hidden compartment apparatus supporting an illusion including a holder slide cover, an attachable cover, and a holder slide member slidably coupled to the bottom of the holder slide cover; (2) An actuating means for automatically moving the holder slide member between a first position and a second position beneath a holder slide cover; (2) A holder slide member that is configured to receive a plurality of inserts capable of holding objects, the inserts being received within integral transport slider pockets; (3) An opening in the holder slide cover reveals a first insert at the first position of the holder slide member and a second insert at the second position of the holder slide member; (4) Actuating means positions the holder slide member below the stationary opening in the holder slide cover to reveal only one insert at any given time.

SUMMARY

In order to accomplish the objectives of the present disclosure, there is provided a hidden compartment apparatus wherein the hidden compartment apparatus supports the illusion that a first object that is placed in a first position of a holder slide member disappears and is replaced with a second object that is placed in a second position of a holder slide member of identical construction.

In an embodiment, the hidden compartment apparatus comprises a housing that includes a holder slide member that is slidably coupled to the bottom of a holder slide cover. Actuating means for automatically moving the holder slide member between a first position and a second position within the housing are provided. The holder slide member is configured to receive a plurality of inserts capable of holding objects. The inserts are received within integral transport slider pockets. The actuating means positions the holder slide member below a stationary opening in the holder slide cover to reveal one insert at a time and wherein the opening reveals a first insert at the first position of the holder slide member or the second insert at the second position of the holder slide member. The actuating means is controlled by a computer control unit and wherein the computer control unit includes user-operated controls to allow user control over the operation of the actuating means and the position of the holder slide member.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

BRIEF DESCRIPTION OF THE DRAWINGS

The present embodiments are illustrated by way of the figures of the accompanying drawings, which may not necessarily be to scale, in which like references indicate similar elements, and in which:

Figure 14:
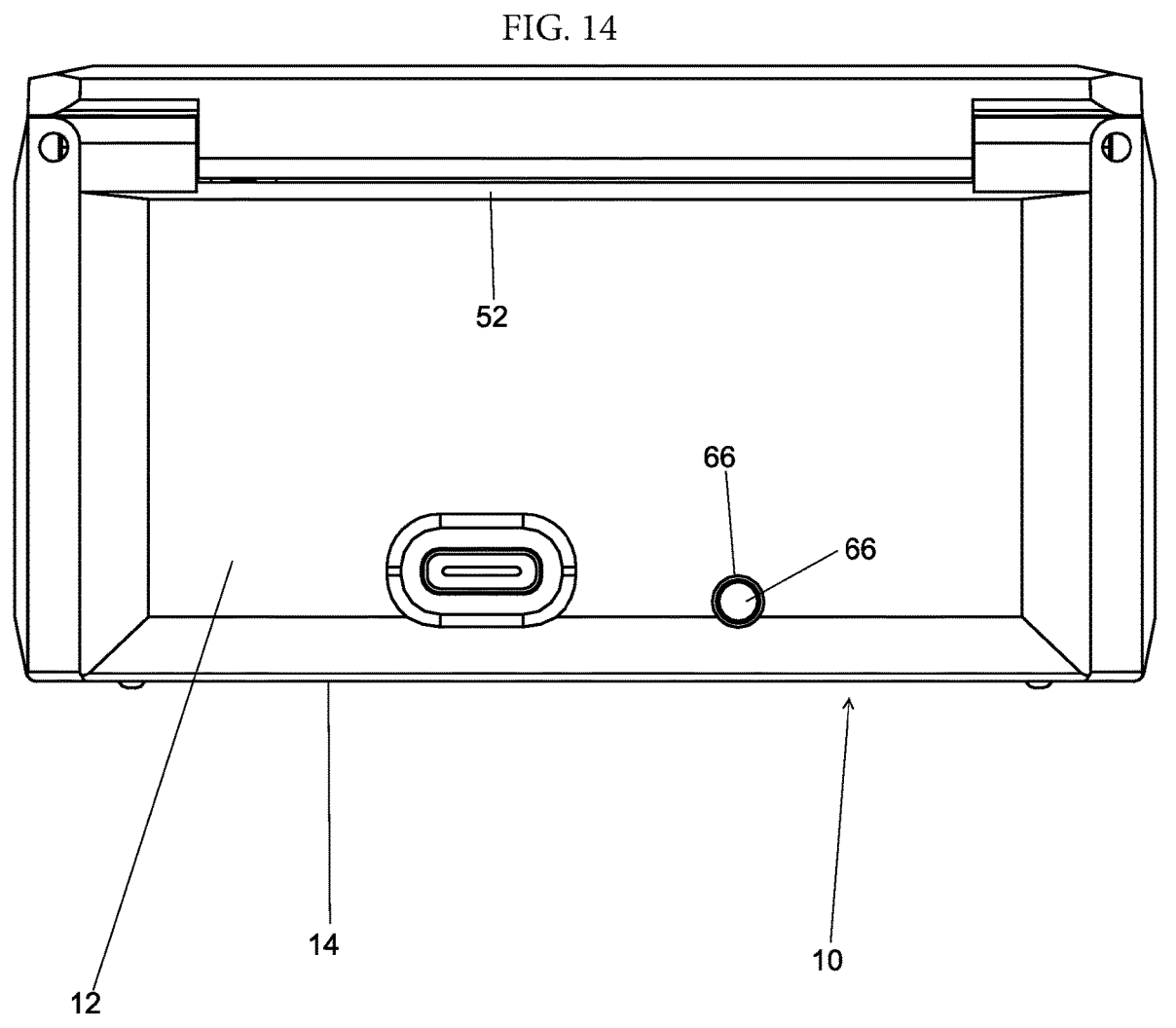

FIG. 14 is a back view of the hidden compartment apparatus showing the USB port and user-operated controls.

DETAILED DESCRIPTION

Figure 1:
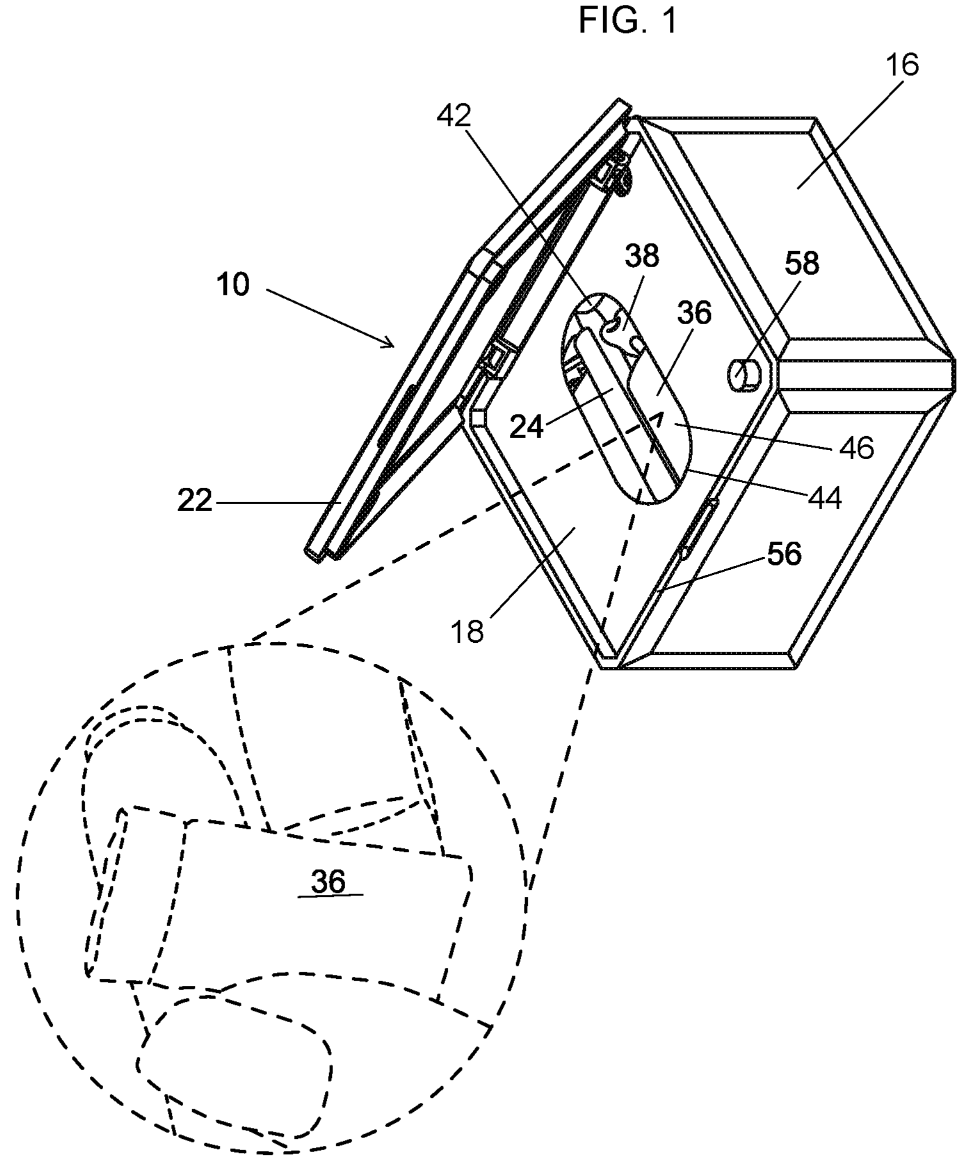
FIGS. 1-2 are perspective views of the hidden compartment apparatus showing the placement of a first item and second item in inserts and the movement of the holder slider member from a first position to a second position.

The following detailed description is the best-contemplated mode of carrying out the disclosure. Although the disclosure has been explained in relation to its preferred embodiment, it is to be understood that many other possible modifications and variations can be made without departing from the spirit and scope of the invention.

Therefore, the hidden compartment apparatus 10 may be used in various types of settings including homes, schools, childcare centers, nurseries, healthcare setting, and the same where the illusion that a first item seemingly disappears and is replaced by a second object in the identical position that was initially selected by the user.

The housing 12 of the apparatus 10 can be constructed in various sizes and can be provided in a standard construction including the provision of durable materials for all elements as provided herein. It can be produced in a standard box-like shape or provided as desired by a user. This can include shapes that are particularly interesting for babies and toddlers and can include round, square, or rectangular shapes. For example, an apparatus having a width of 4.31 inches, a height of 2.31 inches, and a depth of 2.75 inches is suitable for handheld use.

The fabric and color of the inserts 36 can be chosen for visual effects, ethnic or age considerations, design content, protocols, codes, or for other reasons that might enable the illusion described herein. The apparatus 10 can also be constructed in a plurality of colors, textured patterns, embroidery, materials, shapes, textures, prints, and designs to reflect the personal tastes and desires of the manufacturer or users. Logos or designs that are relevant in a particular workplace where such logo or design is necessary for recreational, safety, or health reasons can also be used. In addition, a plurality of decorative elements including trademarks, reflective materials, family heirlooms, and sports memorabilia can be applied and the selective decorative elements can be combined as desired to construct the same.

The control unit of the apparatus 10 can include user-operated controls 66 such as buttons, switches, and displays as well as integrated timers and light emitting diodes to allow user-operated controls 66 over the operation of the actuating means 28 and the position of the holder slide member 24. For example, the housing 12 can include a small circular 1 mm size button that will control the time setting of the box as well as the forced movement of the box. The housing 12 can include LED lights that emit light through the top of the integral transport slider pockets 42 when the apparatus 10 is turned on.

A circuit board can be programmed to slide the transport slider pockets 42 after a predetermined period of time. For example, a user-operated control of a predetermined size can be programmed to move the pockets 42 after the passage of 6 hours. LED lights can blink to indicate that the motor 62 is successfully set to move the pockets 42 at a specified time. The user-operated controls can have the ability to force slide the pockets 42 after being pressed and held in place for a specified period of time. For example, pressing and holding the user-operated control in place for three seconds can reset the integral transport slider pockets 42 to a position wherein the first object 38 is replaced. The user-operated control 66 can thereby be improved to advantageously incorporate additional modes to properly use the apparatus 10.

Additional features of the hidden compartment apparatus 10 include a universal serial bus (USB port) being mounted on the side walls 16 of the housing 12 and a power source 68 that can include at least one battery circuit with rechargeable lithium-ion batteries. An on/off switch is connected to the battery circuit for switching the hidden compartment apparatus 10 on and off as needed. It is feasible to change the position of the on/off switch to enable the proper usage of the apparatus 10 and to allow the user to quickly locate the switch without any unnecessary rotations of the apparatus 10.

If the components of the invention are arranged correctly, children in the viewing vicinity of the apparatus 10 are not aware that the identical inserts 36 are provided in the hidden compartment apparatus 10. It is crucial therefore that the illusion is not revealed by positioning the transport slider pockets 42 in a first position 32, preloading a first object 38 into the first insert 46, and preparing the second insert 48 for loading a second object 38 by setting the transport slider pockets 42 to a second position 34.

Preloading the First Object

In an exemplary use of the hidden compartment apparatus 10 within the home, a parent temporarily conceals the apparatus 10 from the child, locates the on and off switch on the bottom of the apparatus 10 and turns it to the "on" position. The parent opens the attachable cover 22 to expose the transport slider pockets 42 in a first position 32 and the first insert 46. The parent places an object 38 inside the first insert 46 and places the first insert 46 inside the first position 22 of the transport slider pockets 42. The parent closes the attachable cover 22, locates the button, and holds it for a pre-determined time. The first insert 46 of the transport slider pockets 42 then slides into a hidden position and wherein this movement of the holder slider member 24 will expose an empty transport slider pocket 42 in the second position 34 of the holder slider member 34. The apparatus 10 is then turned off and the user awaits the loading of a second object 38.

Loading the Second Object

In an exemplary scenario, the apparatus 10 is used to enhance the illusion of a disappearing object by first creating support for the realism of the tooth fairy and placing the preloaded apparatus 10 in the child's room. The parent can read stories related to the tooth fairy and the child becomes excited about the tooth fairy's visit. The anticipation of receiving the reward from losing a tooth makes the child cheerful about an otherwise undesirable situation. At bedtime and in a discreet manner, the parent can set the apparatus 10 at a predetermined time by locating the on/off switch, turning the switch to the on position, and pressing a user-operated control 66 such as a button. In an exemplary embodiment, the predetermined time for the motor 62 to move transport slider pocket 42 can be six hours after the second object has been placed in an insert 36 and double pressing the button located on the back surface of the apparatus 10. Additional blinking lights can be provided and aligned with the button to ensure that the timer is successfully set. The child places the tooth inside an insert 36 located inside the transport slider pocket 42. After the predetermined time has elapsed, the tooth will slide into the hidden position which will in turn expose the transport slider pocket 42 holding the insert 36 with an object 38 such as a dollar bill. In the morning, the child is ecstatic and surprised to find a single bill in place of the tooth.

The plurality of objects 38 associated with the hidden compartment apparatus 10 may be a child's tooth, letters, holiday objects, props, tinkling fairy dust, money, or objects that can be temporarily concealed from a child audience to create an illusion. The hidden compartment apparatus 10 can be constructed with improved mechanical strength and with additional user-operated controls 66 to improve functionality. Additional performance enhancing user-operated controls 66 or the same can be positioned in a suitable manner to improve the vertical movement of the holder slide member 24. The size of the holder slide member 24 in relation to the plurality of side walls 16 of the apparatus 10 can be re-designed based on the mobility needs of a designer of the apparatus 10.

It is contemplated that the description, taken with the drawings, makes apparent to those skilled in the art how an embodiment of the disclosure may be practiced. Variations of this embodiment may include, but are not limited to, additional or fewer holder slide members and transport slider pockets, additional or fewer inserts 36 capable of holding objects 38. For example, in an embodiment with additional transport slider pockets 42, a modified holder slide member 24 would be required.

It can be appreciated that the implementation of a hidden compartment appratus or a similar apparatus 10 for creating the illusion that an object has disappeared can include inserts 36 in which a plurality of objects 38 of variable construction are hidden. For example, velvet, foam, felt, yarn, cotton, or similar fabrics can be considered as the inserts 36 so as to accommodate various types of objects 38.

In an embodiment, the hidden compartment apparatus 10 comprises a housing 12 that includes a holder slide member 24 that is slidably coupled to the bottom of a holder slide cover 18. The holder slide member 24 engages with the holder slide cover 18 so as to slide along the bottom thereof and move the holder slide member 24 from a first position 32 to a second position 34 and whereby the holder slide member 24 is locked against movement when a first position 32 or a second position 34 is established. Actuating means for automatically moving the holder slide member 24 between a first position 32 and a second position 34 within the housing 12 are provided. The primary object of the apparatus 10 is to provide a holder slide member 24 that is lightweight and easily operable with the desired force exerted thereon. The holder slide member 24 is further configured to receive a plurality of inserts 36 and capable of holding objects 38 that are received within integral transport slider pockets 42. The motor 62 is provided with sliders and slide controls to position the holder slide member 24 below the stationary opening 44 in the holder slide cover 18. Once the attachable cover 22 is lifted, the user can observe at least one insert 36 at a time and wherein the stationary opening 44 can reveal a first insert 46 at the first position 32 of the holder slide member 24 or the second insert 48 at the second position 34 of the holder slide member 24. The actuating means is controlled by the computer control unit 64 which thereby provides user control over the position of the holder slide member 24.

Figure 2:
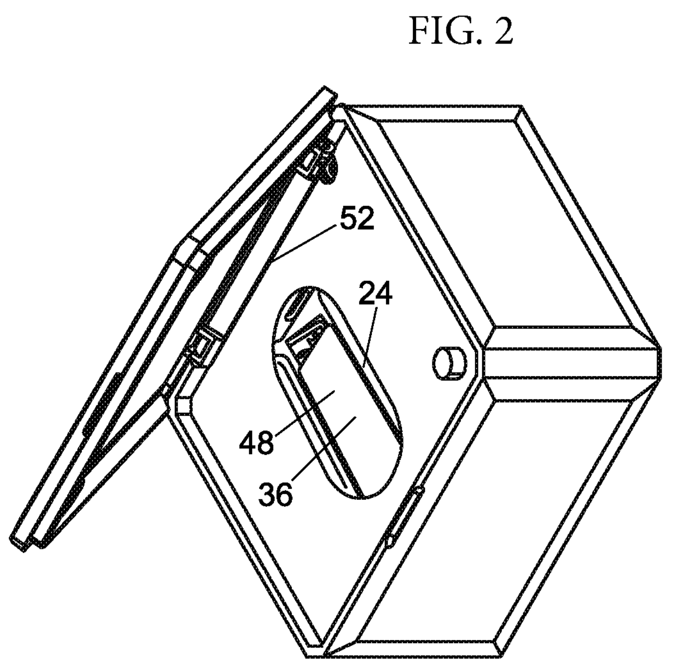
Figure 3:
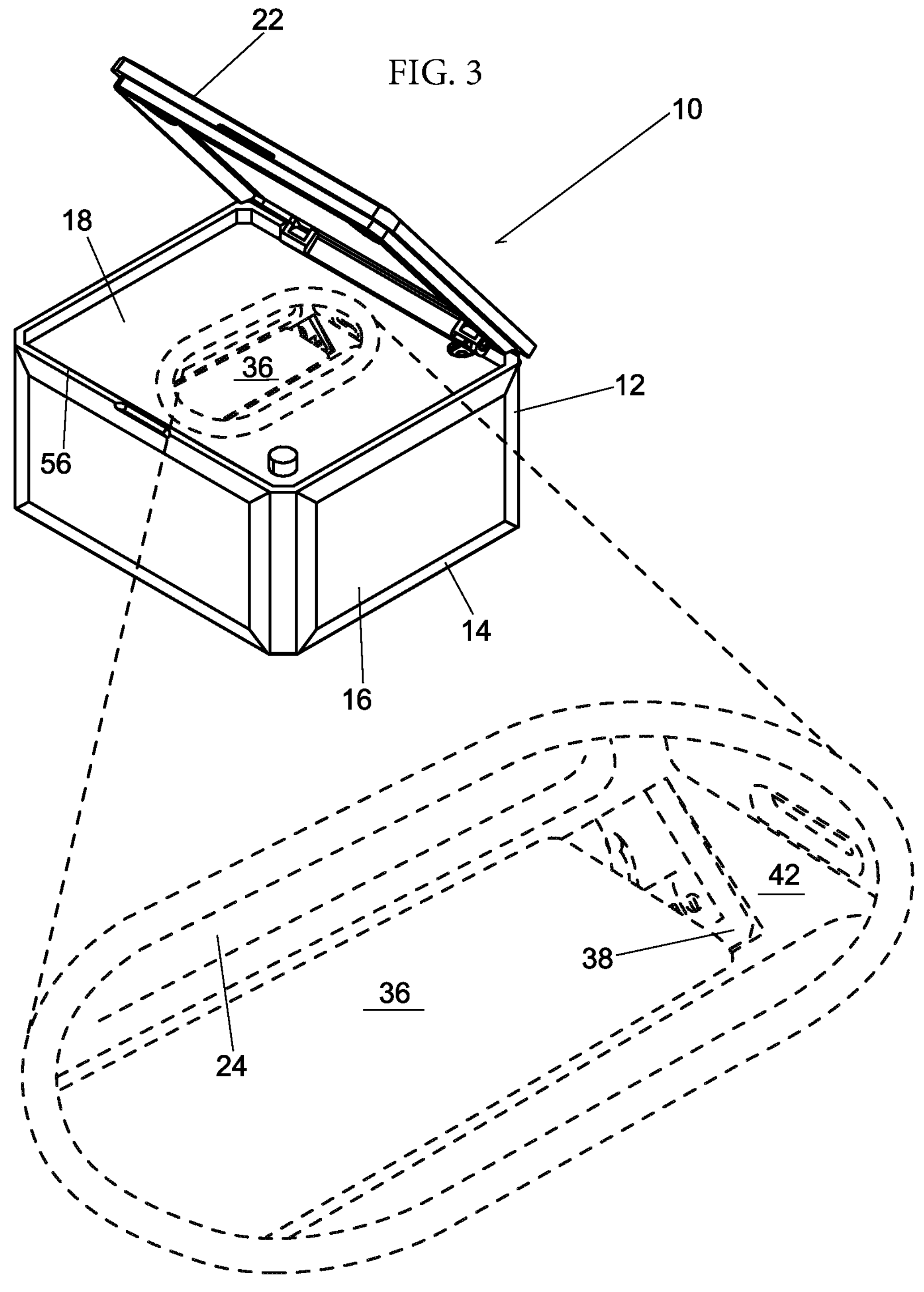
FIG. 3 is a an exploded view of the interior of an integral transport slider pocket.
Figures 4, 5:
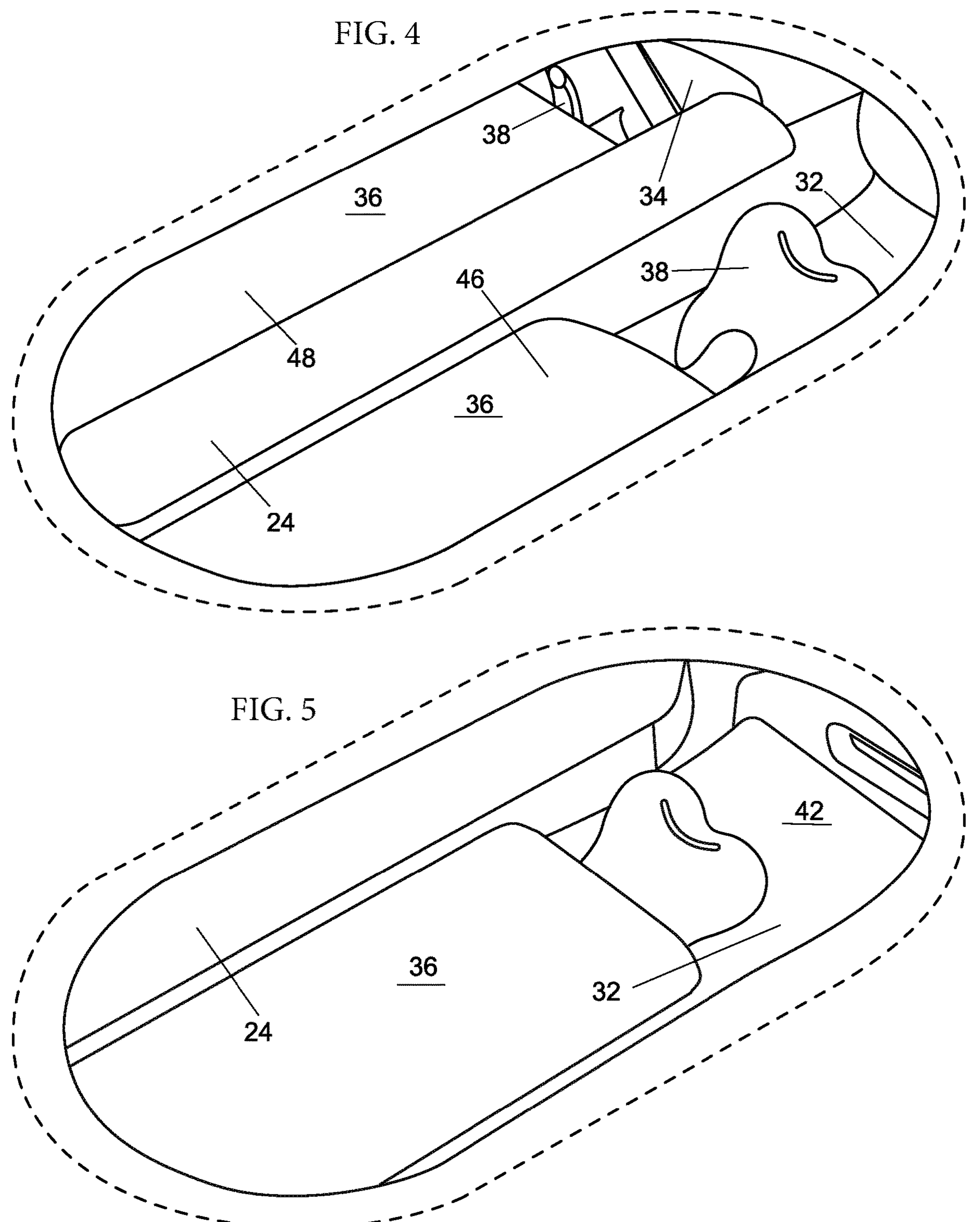
FIGS. 4 and 5 are exploded views showing the placement of a first item and a second item in inserts and the movement of the holder slider member from a first position to a second position.
Figure 6:
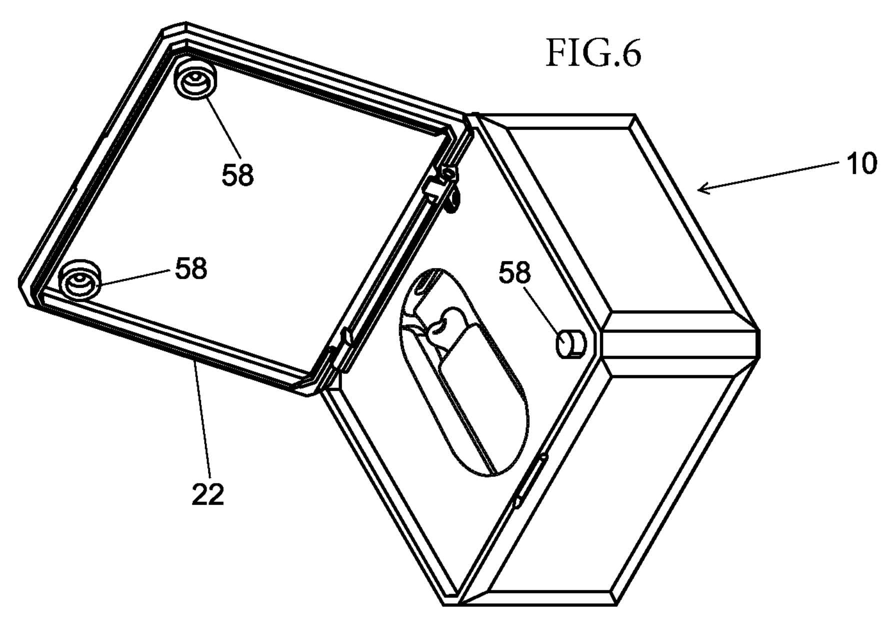
FIGS. 6-8 are exemplary illustrations of the hidden compartment apparatus showing the movement of the attachable cover.
Figure 7:
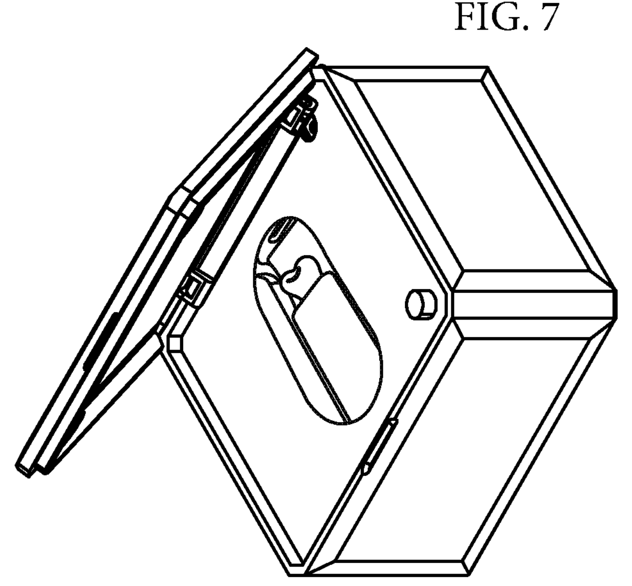
Figure 8:
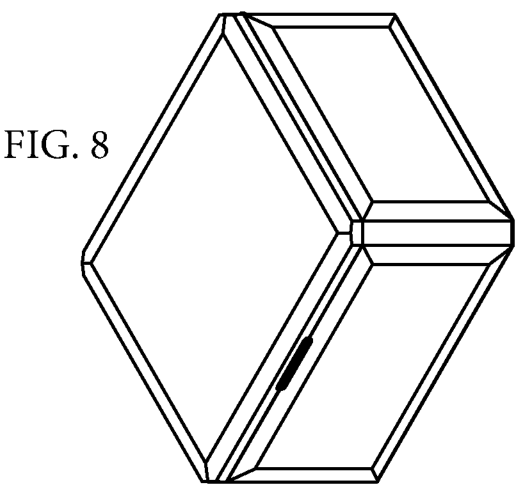
Figure 9:
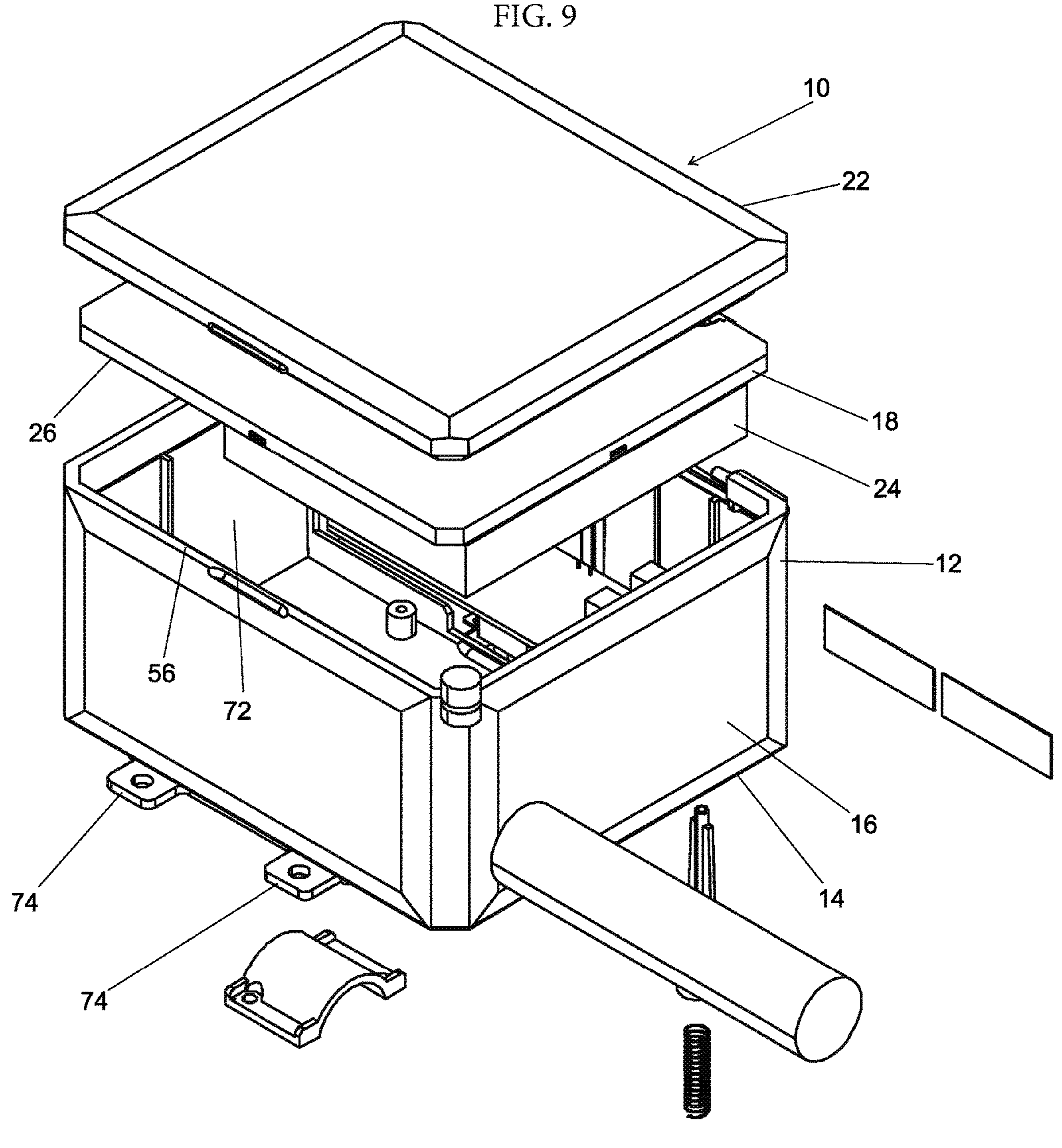
FIG. 9 is an exploded view showing the assembly of the hidden compartment apparatus including the attachable cover, holder slide cover, holder slide member, and housing.
Figures 10, 11, 12, 13:
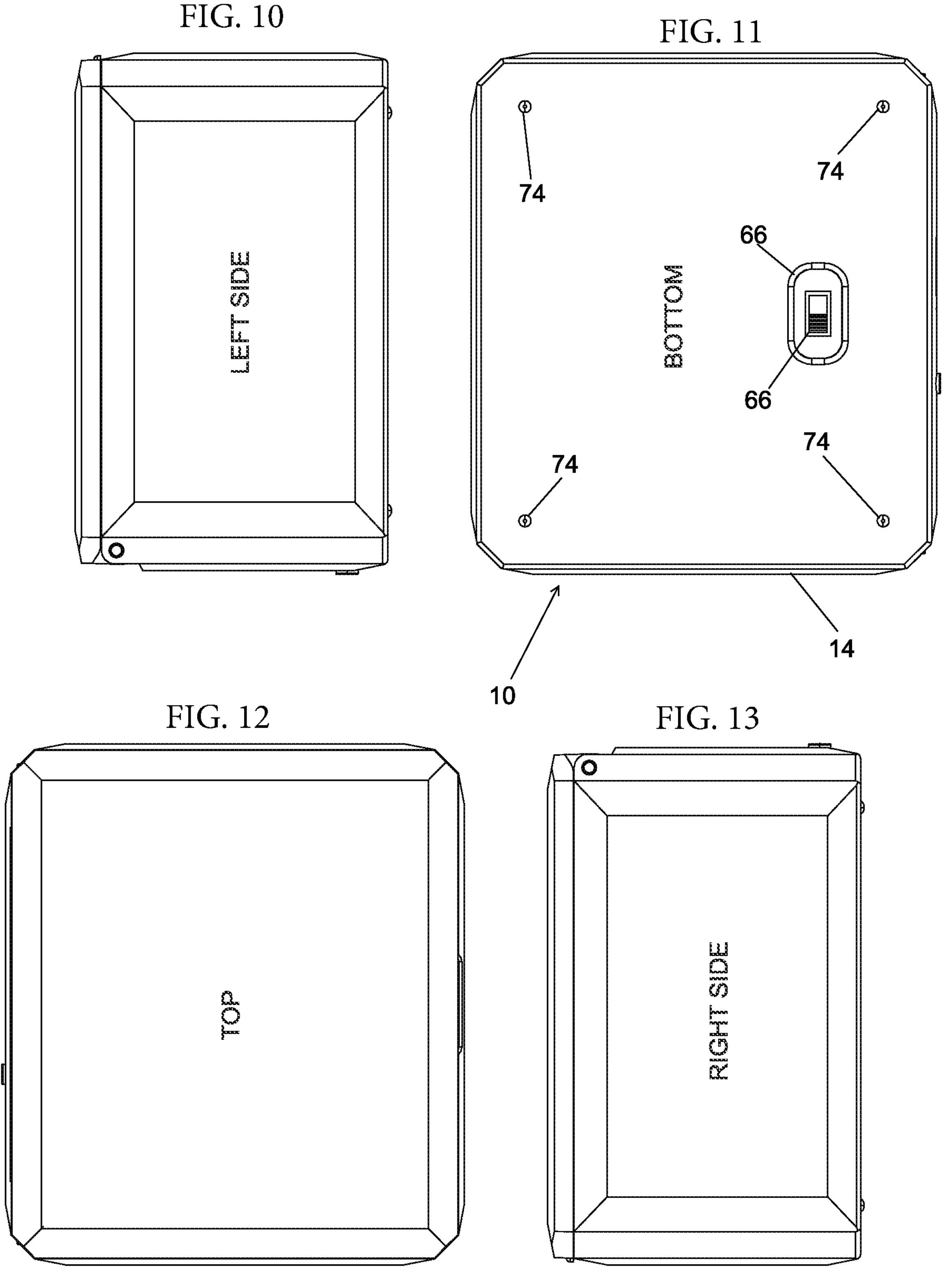
FIGS. 10-13 are left, bottom, top, and right sides of the hidden compartment apparatus respectively.
Figure 15:
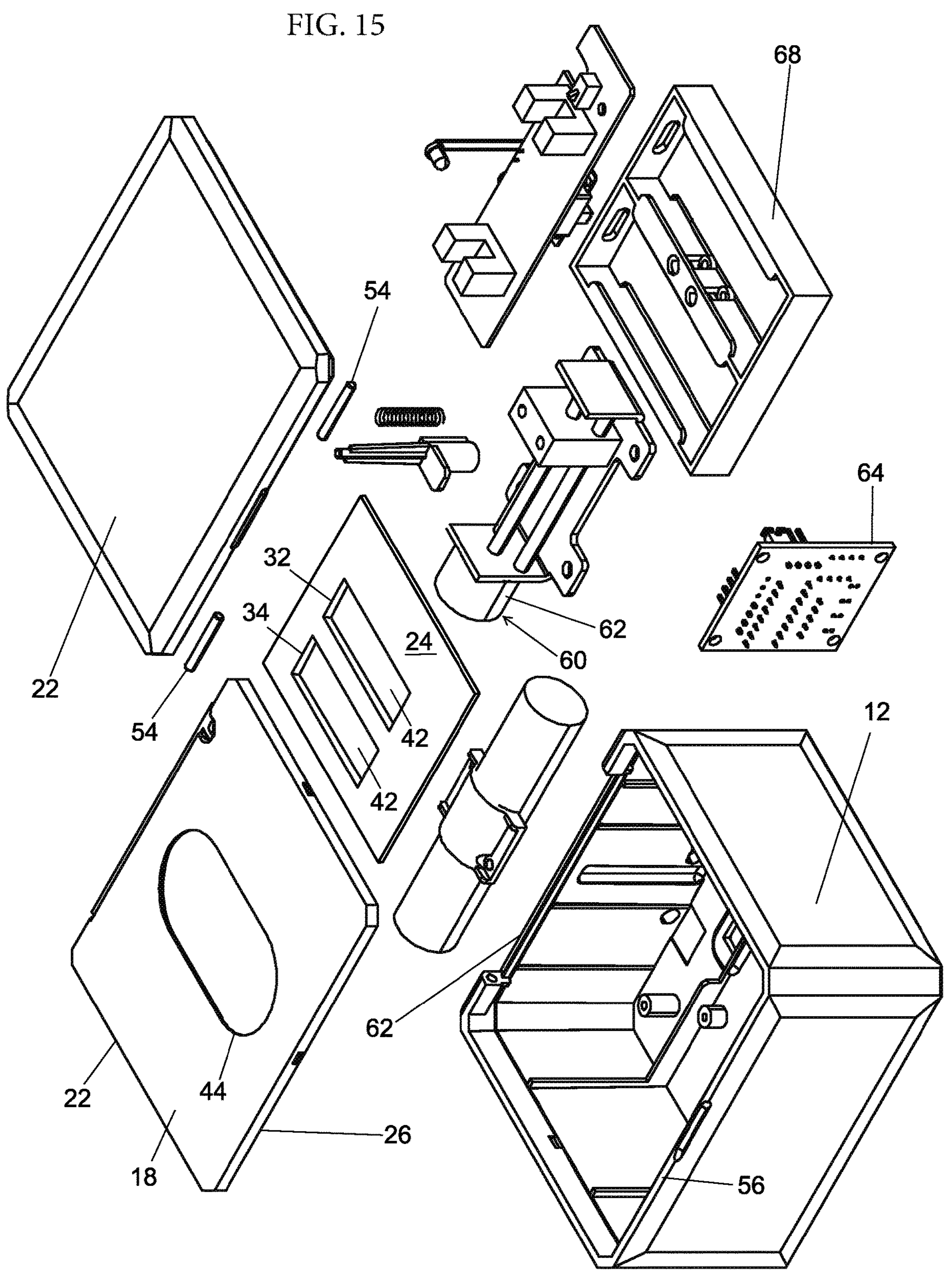
FIG. 15 is an exploded view showing the assembly of the hidden compartment apparatus including the attachable cover, holder slide cover, holder slide member, housing, integral transport slider pockets, motor assembly, and computer control unit.

Referring now to FIGS. 1-15, an automatically actuated hidden compartment apparatus 10 supporting an illusion is presented. The hidden compartment apparatus 10 comprises a housing 12 that includes a removable base 12, a plurality of side walls 16, a holder slide cover 18, and an attachable cover 22. A holder slide member 24 is slidably coupled to the bottom 26 of the holder slide cover 18. An actuating means for automatically moving the holder slide member 24 between a first position 32 and a second position 34 is provided within the housing 12.

The holder slide member 24 is configured to receive a plurality of inserts 36 capable of holding objects 38 and the inserts 36 being received within integral transport slider pockets. An opening 44 in the holder slide cover 18 reveals a first insert 46 at the first position 32 of the holder slide member 24 and a second insert 48 at the second position 34 of the holder slide member 24 and wherein the actuating means positions the holder slide member 24 below the stationary opening 44 in the holder slide cover 18 to reveal only one insert at any given time.

The attachable cover 22 is hingably attached to the housing 12 and wherein the attachable cover 22 is a lid or door which is secured to a first side 52 of the housing 12 by a plurality of hinge members 54 and to a second side 56 of the housing 12 by one or more magnets 58. The attachable cover 22 is capable of moving between an opened position and a closed position and, wherein the attachable cover 22 covers the holder slide cover 18 when in the closed position.

The actuating means is a motor driver assembly 60 driven by a direct current motor 62 controlled by a computer control unit 64 and wherein the computer control unit 64 includes user-operated controls 66 such as buttons, switches, and displays as well as integrated timers and light emitting diodes to allow user control over the operation of the actuating means and the position of the holder slide member 24. The actuating means and the power source 68 are housed within the central cavity 72 formed by the plurality of side walls 16, the removable base 12, and the attachable cover 22 of the housing 12. The central cavity 72 is accessible through the removable base 12 and wherein the removable base 12 is attached to the housing 12 by a plurality of fastening means 74.

Certain components necessary to the operation of the hidden compartment apparatus 10 are not shown or described in detail because they are components well known to those in the relevant arts. These components include well-known components, attachments, parts, and operations.

While the invention has been described in detail and with reference to specific embodiments thereof, it will be apparent to one skilled in the art that various changes and modifications can be made therein without departing from the spirit and scope thereof.

What is claimed is:

1. An automatically actuated hidden compartment apparatus supporting an illusion, comprising:

a housing that includes a removable base, a plurality of side walls, a holder slide cover, and an attachable cover;

a holder slide member slidably coupled to the bottom of the holder slide cover;

an actuating means for automatically moving the holder slide member between a first and a second position within the housing;

where the holder slide member is configured to receive a plurality of inserts capable of holding objects, the inserts being received within integral transport slider pockets and where a stationary opening in the holder slide cover reveals a first insert at the first position of the holder slide member and a second insert at the second position of the holder slide member, wherein the actuating means positions the holder slide member below the stationary opening in the holder slide cover to reveal only one insert at any given time.

2. The hidden compartment apparatus of claim 1, where the inserts are made of foam or felt.

3. The hidden compartment apparatus of claim 1, where the attachable cover is hingeably attached to the housing.

4. The hidden compartment apparatus of claim 3, where the attachable cover is a lid or door which is secured to a first side of the housing by a plurality of hinge members and to a second side of the housing by one or more magnets and is capable of moving between an open position and a closed position, wherein the attachable cover covers the holder slide cover when in the closed position.

5. The hidden compartment apparatus of claim 1, where the actuating means is a motor driver assembly driven by a direct current motor controlled by a computer control unit.

6. The hidden compartment apparatus of claim 5, wherein the computer control unit includes user operated controls such as buttons, switches, and displays as well as integrated timers and light emitting diodes to allow user control over the operation of the actuating means and the position of the holder slide member.

7. The hidden compartment apparatus of claim 1, wherein the actuating means and a power source is housed within a central cavity formed by the plurality of side walls, the removable base, and the attachable cover of the housing.

8. The hidden compartment apparatus of claim 7, where the central cavity is accessible through the removable base, wherein the base is attached to the housing by a plurality of fastening means.

9. A method for creating an illusion of a disappearing object, comprising the steps of:

providing a hidden compartment apparatus which includes a housing with a removable base, a plurality of side walls, a holder slide cover, and an attachable cover moveable between an open and a closed position, a holder slide member slidably coupled to the bottom of the holder slide cover, and an actuating means for automatically moving the holder slide member between a first and a second position within said housing, the actuating means includes a computer control unit and user controls for controlling the position of the holder slide member;

wherein the attachable cover is opened to reveal the holder slide cover containing a stationary opening through which a first insert contained within a first integral pocket of the below holder slide member in the first position can be viewed;

inserting a first object into the first insert;

engaging an actuating means contained within a central cavity formed within the housing to automatically move the holder slide member to the second position of the holder slide member;

wherein the movement of the holder slide member from the first position to the second position fully obfuscates the first insert and first object below the holder slide cover and reveals an empty second insert contained within a second integral pocket of the below holder slide member;

setting a timer within the control unit of the actuating means and securing the base to the housing using fastening means and closing the holder slide cover;

wherein the method further comprises a second user opening the holder slide cover and places a second object into the second insert contained within a second integral pocket of the below holder slide member;

where at the expiration of the timer the actuating means automatically moves the holder slide member from the second position to the first position to reveal the first insert containing the first object at the stationary opening in the holder slide cover and fully obfuscating the second insert and the second object beneath the holder slide cover.

10. The method of claim 9, where the attachable cover is a lid or door which is secured to a first side of the housing by a plurality of hinge members and to a second side of the housing by one or more magnets and is capable of moving between an open position and a closed position, wherein the attachable cover covers the holder slide cover when in the closed position.

11. The method of claim 9, where the actuating means is a motor driver assembly driven by a direct current motor controlled by a computer control unit.

12. The method of claim 11, wherein the computer control unit includes user operated controls such as buttons, switches, and displays as well as integrated timers and light emitting diodes to allow user control over the operation of the actuating means and the position of the holder slide member.

13. The method of claim 9, wherein the actuating means and a power source is housed within a central cavity formed by the plurality of side walls, the removable base, and the attachable cover of the housing.

* * * * *